US011688031B2

(12) United States Patent
Koo et al.

(10) Patent No.: US 11,688,031 B2
(45) Date of Patent: Jun. 27, 2023

(54) RESYNCHRONIZATION OF A DISPLAY SYSTEM AND GPU AFTER PANEL SELF REFRESH

(71) Applicant: ATI TECHNOLOGIES ULC, Markham (CA)

(72) Inventors: Anthony W L Koo, Markham (CA); Syed Athar Hussain, Markham (CA); David I. J. Glen, Markham (CA)

(73) Assignee: ATI TECHNOLOGIES ULC, Markham (CA)

( * ) Notice: Subject to any disclaimer, the term of this patent is extended or adjusted under 35 U.S.C. 154(b) by 0 days.

(21) Appl. No.: 17/060,942

(22) Filed: Oct. 1, 2020

(65) Prior Publication Data

US 2022/0108418 A1    Apr. 7, 2022

(51) Int. Cl.
*G09G 5/393* (2006.01)
*G06T 1/20* (2006.01)
*G09G 3/36* (2006.01)

(52) U.S. Cl.
CPC ............. *G06T 1/20* (2013.01); *G09G 3/3618* (2013.01); *G09G 2340/16* (2013.01); *G09G 2360/18* (2013.01)

(58) Field of Classification Search
CPC ..... G09G 2340/0435; G09G 2330/021; G09G 2360/18; G09G 2320/103; G09G 5/12; G09G 5/363; G09G 2330/023; G09G 5/393; G09G 2360/127; G09G 2370/04; G09G 3/3618; G09G 2310/08; G09G 2340/18; G06F 1/3265; G06T 1/00
See application file for complete search history.

(56) References Cited

U.S. PATENT DOCUMENTS

| | | | |
|---|---|---|---|
| 6,297,817 | B1 | 10/2001 | Larson |
| 6,754,234 | B1 | 6/2004 | Wiesner et al. |
| 1,657,775 | A1 | 2/2010 | Wagner |
| 8,645,585 | B2 | 2/2014 | Wyatt et al. |
| 2003/0137528 | A1 | 7/2003 | Wasserman et al. |
| 2004/0075621 | A1 | 4/2004 | Shiuan |
| 2007/0159412 | A1 | 7/2007 | Dai |
| 2007/0206018 | A1 | 9/2007 | Baljic |

(Continued)

OTHER PUBLICATIONS

U.S. Appl. No. 16/889,318, filed Jun. 1, 2020, listing Jun Lei et al. as inventors, entitled "Display Cycle Control System".

(Continued)

*Primary Examiner* — Hau H Nguyen

(57) ABSTRACT

A display system receives first timing information prior to the display system entering a panel self-refresh (PSR) mode. The display system supports a range of refresh rates. Prior to the display system entering the PSR mode, first timing information indicating a first refresh rate that is lower than a maximum refresh rate supported by the display system is received by the display system. The display system then refreshes images at a second refresh rate that is less than or equal to the first refresh rate using a frame stored in a buffer prior to entering the PSR mode. In some cases, the processing unit also receives second timing information from the display system in response to initiating an exit from a panel self-refresh (PSR) mode. The second timing information indicates a current scanout line that is used to schedule transmission of a subsequent frame.

28 Claims, 10 Drawing Sheets

(56) References Cited

U.S. PATENT DOCUMENTS

| | | | |
|---|---|---|---|
| 2011/0043514 A1 | 2/2011 | Hussain et al. | |
| 2013/0033504 A1 | 2/2013 | Nugent et al. | |
| 2013/0145107 A1 | 6/2013 | Sadowski et al. | |
| 2019/0051269 A1* | 2/2019 | Kwa | G09G 5/006 |
| 2020/0327862 A1* | 10/2020 | Sinha | G06F 3/1431 |

OTHER PUBLICATIONS

U.S. Appl. No. 16/436,876, filed Jun. 10, 2019 listing Koo, Anthony WL. as first inventor, entitled, "Frame Replay for Variable Rate Refresh Display,", 42 pages.

U.S. Appl. No. 16/670,618, filed Oct. 31, 2019 listing Callway, Ed as first inventor, entitled, "Frame-Rate Based Illumination Control at Display Device,", 107 pages.

U.S. Appl. No. 16/670,635, filed Oct. 31, 2019 listing Callway, Ed as first inventor, entitled, "Strobe Configuration for Illumination of Frame at Display Device,", 104 pages.

U.S. Appl. No. 16/670,673, filed Oct. 31, 2019 listing Callway, Ed as first inventor, entitled, "Region-by-Region Illumination Control at Display Based on Per-Region Brightness,", 109 pages.

U.S. Appl. No. 16/670,651, filed Oct. 31, 2019 listing Callway, Ed as first inventor, entitled, "Region-by-Region Illumination Control at Display Device Based on Per-Region Motion Estimation,", 107 pages.

U.S. Appl. No. 16/670,664, filed Oct. 31, 2019 listing Callway, Ed as first inventor, entitled, "Foveated Illumination Control at Display Device,", 106 pages.

International Search Report and Written Opinion dated Aug. 19, 2021 for PCT/IB2021/054771, 10 pages.

Non-Final Office Action dated Dec. 6, 2021 for U.S. Appl. No. 16/889,318, 41 pages.

Notice of Allowance dated Apr. 20, 2022 for U.S. Appl. No. 16/889,318, 7 pages.

Final Office Action dated Aug. 6, 2021 for U.S. Appl. No. 16/889,318, 22 pages.

International Preliminary Report on Patentability issued in Application No. PCT/IB2021/054771, dated Dec. 6, 2022, 7 pages.

\* cited by examiner

RESYNCHRONIZATION OF A DISPLAY SYSTEM AND GPU AFTER PANEL SELF REFRESH

BACKGROUND

A display system includes a screen that displays video rendered by a processor such as a graphics processing unit (GPU), which provides the rendered video to the display system in a stream of frames. A conventional GPU provides information representative of pixels in a frame during a vertical active region of the frame. In addition to the vertical active region, the frame includes a vertical blanking region. The GPU does not transmit active video information during the vertical blanking region of the frame, although metadata such as that used to define pixel formats can be transmitted during the vertical blanking region. For example, a high definition frame can represent an image using 1080 active lines that include values of the pixels and 45 vertical blanking lines. The display system stores the pixels in a buffer prior to (or concurrently with) reading out the pixel values to present an image on a screen. The GPU provides the frames at a refresh rate that is determined by the GPU timing and the timing of the display system is synchronized to the GPU timing. For example, the GPU can provide frames at 60 Hz and the display system can read/display the frames at 60 Hz at times that are synchronized to the GPU.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
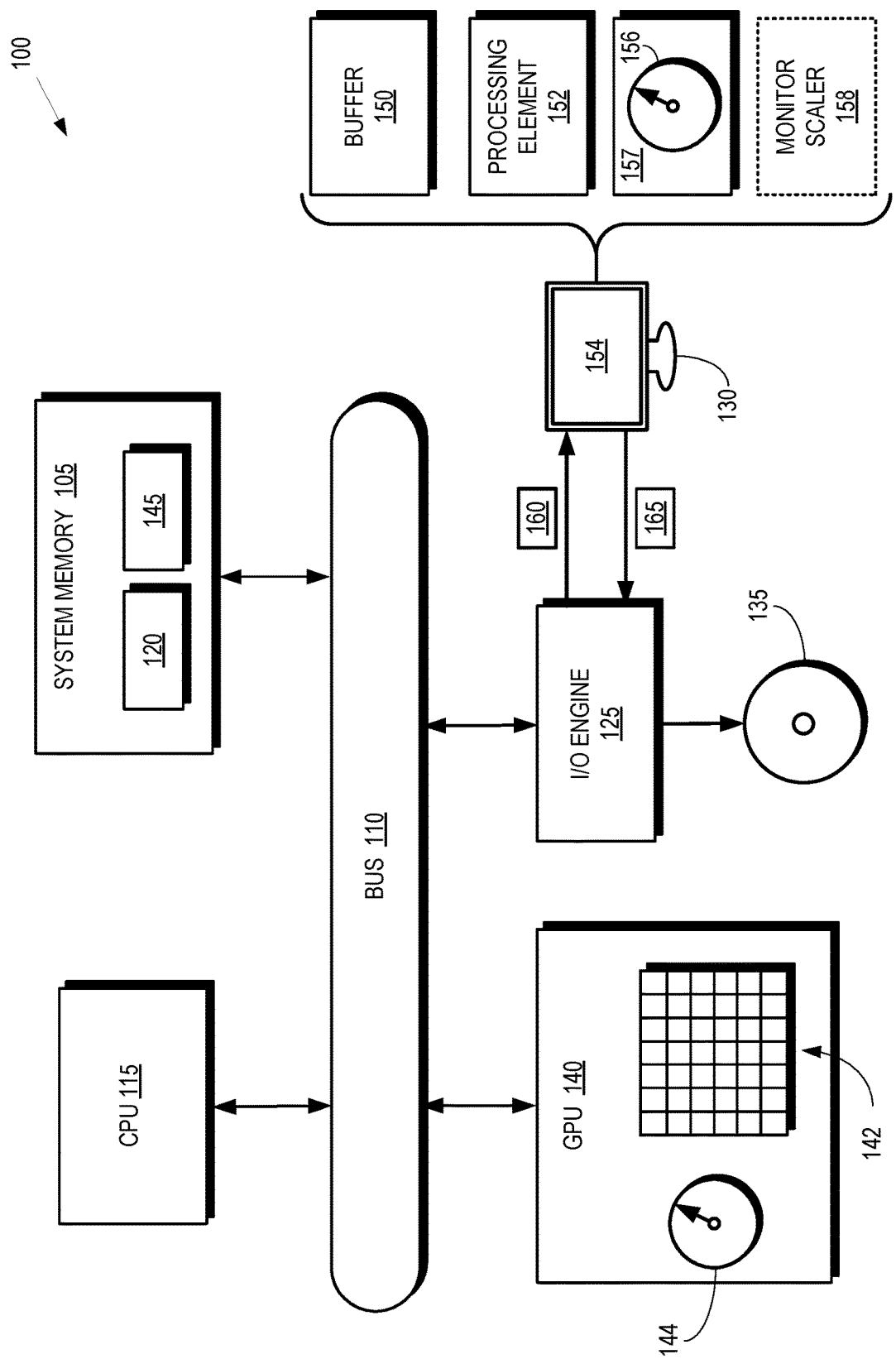
FIG. 1 is a block diagram of a processing system that supports resynchronization following a panel self-refresh (PSR) mode of operation according to some embodiments.

Some display systems implement a panel self-refresh (PSR) mode that conserves power by allowing the GPU to stop outputting frames to the display system and enter a low power state when the system is displaying a static frame. In some cases, the GPU shifts to a coarse (and therefore less accurate) timing reference to conserve power in the low power state or the GPU could power down to an OFF state. The display system captures frames in a remote frame buffer (RFB) and, during the PSR mode, the display system refreshes the screen using the captured frame at periodic intervals determined by an internal timing reference for the display system. The GPU and the display system exit the PSR mode to allow contents of the display screen to be updated. For example, activities such as user input potentially cause a screen update, although screen updates can occur even without such events in response to activities such as a user providing input via a touch screen. The GPU resumes providing frames to the display system in response to exiting the PSR mode. However, the GPU timing is likely to be out of phase with the timing used by the display system during the PSR mode, particularly if the GPU shifted to a coarse timing reference during the PSR mode or a GPU timing generator is disabled, in which case the timing reference is restarted at an arbitrary time. The GPU and the display system therefore re-synchronize in response to exiting the PSR mode. However, the resynchronization should not be performed at an arbitrary time because visual artifacts are produced if a newer frame provided by the GPU (according to the GPU timing) overlaps with the display system reading a previously provided frame from the buffer according to the internal display system timing.

To avoid the visual artifacts produced in the absence of synchronization between the GPU and the display system, some display systems transmit an explicit resynchronization signal to the GPU over a dedicated wire in response to exiting the PSR mode. The GPU determines when to begin transmitting new frames based on the explicit resynchronization signal. However, many display systems operate according to the embedded display port (eDP) display panel interface standard for portable and embedded devices. The eDP standard does not include a dedicated wire to transmit an explicit resynchronization signal from the display system to the GPU in response to exiting the PSR mode. Thus, a synchronization conflict can arise between the GPU and the display system during the PSR mode. One potential technique for re-synchronizing the GPU and the display system in the absence of an explicit resynchronization signal is to progressively align GPU frames with the vertical blanking region at the display system by refreshing the display system at a rate that is slightly lower than the refresh rate used by the GPU, e.g., the display system uses a refresh rate of 59.8 Hz and the GPU uses a refresh rate of 60 Hz. However, this approach to alignment typically takes several frames and therefore introduces latency that undesirably affects the user experience in latency sensitive applications.

FIGS. 1-11 disclose embodiments of resynchronization between a GPU and a display system that supports a variable refresh rate within a range that is below a maximum refresh rate. The variable refresh rate corresponds to a range of vertical blanking regions that are equal to or larger than a minimum blanking region that corresponds to the maximum refresh rate. The resynchronization of the variable refresh rate display system is performed in the absence of an explicit resynchronization signal (or dedicated wire to convey the explicit resynchronization signal) using timing information exchanged between the GPU and the display system prior to entering a panel self-refresh (PSR) mode. Prior to entering the PSR mode, the GPU provides frames to the display system at a nominal refresh rate that corresponds to a nominal duration of a vertical blanking region. The display system displays the received frames at the nominal refresh rate prior to entering the PSR mode.

The variable refresh rate implemented in the display system allows the display system to set a vertical blanking region to be longer than the minimum vertical blanking region or, correspondingly, select a refresh rate that is lower than the maximum refresh rate corresponding to the minimum blanking region. Using the variable refresh rate feature to choose a longer vertical blanking region at the display system reduces the number of frames that are transmitted by the GPU after exiting the PSR mode and before the display system re-synchronizes with the GPU. For example, the GPU can instruct the display system to extend the vertical blanking region beyond the minimum vertical blanking region to produce a frame length equal to at least twice the total duration of a nominal frame minus the duration of a nominal vertical blanking region ensures that resynchronization is completed within two frames of exiting the PSR mode. The display system modifies its refresh rate (and duration of the vertical blanking region) based on timing information received from the GPU, e.g., by increasing the duration of the vertical blanking region of the frames retrieved from the remote frame buffer and displayed during the PSR mode.

In some embodiments, the display system provides timing information to the GPU that indicates the current scanout line at the display system via a side channel supported by the interface standard such as an AUX channel. The current scanout line is the vertical line (e.g., a line in the vertical active region or the vertical blanking region) that is being read or displayed by the display system when the timing information is provided to the GPU. The GPU then determines when to resume transmitting frames to the display system based on the received timing information. For example, the GPU uses the value of the current scanout line, the number of lines in the vertical active region, and a line period to determine a subsequent time that corresponds to the end of a vertical blanking region at the display system. The GPU delays transmitting a new frame until the next vertical blanking region if the current scanout line indicates that the new frame overlaps with a vertical active region of a previously received frame that is being displayed by the display system. If the current scanout line is within the vertical blanking region, and it is some safety margin away from the start of next vertical active region, the GPU starts transmission of the new frame immediately. Some embodiments of the GPU adjust the estimate of the subsequent time based on a delay associated with receiving and processing the current scanout line from the display system, e.g., using pre-tuning or runtime calibration of the delay introduced by the AUX channel.

In some embodiments, the timing information provided by the display system includes information indicating a preferred synchronization time, e.g., information indicating that the GPU should output the first frame a specified number of lines from the start of the vertical blanking region. In some embodiments, the GPU provides the information indicating the vertical blanking region and the display system provides the current scanout line to allow the GPU to schedule transmission of the first frame during the extended blanking region.

FIG. 1 is a block diagram of a processing system 100 that supports resynchronization following a panel self-refresh (PSR) mode of operation according to some embodiments. The processing system 100 includes or has access to a system memory 105 or other storage component that is implemented using a non-transitory computer readable medium such as a dynamic random-access memory (DRAM). However, some embodiments of the memory 105 are implemented using other types of memory including static RAM (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes a central processing unit (CPU) 115. Some embodiments of the CPU 115 include multiple processing elements (not shown in FIG. 1 in the interest of clarity) that execute instructions concurrently or in parallel. The processing elements are referred to as processor cores, compute units, or using other terms. The CPU 115 is connected to the bus 110 therefore communicates with the memory 105 via the bus 110. The CPU 115 executes instructions such as program code 120 stored in the memory 105 and the CPU 115 stores information in the memory 105 such as the results of the executed instructions. The CPU 115 is also able to initiate graphics processing by issuing draw calls.

An input/output (I/O) engine 125 handles input or output operations associated with a display system 130, as well as other elements of the processing system 100 such as keyboards, mice, printers, external disks, and the like. The display system 130 supports a variable refresh rate so that the display system 130 can present frames at refresh rates within a range up to a maximum refresh rate. The variable refresh rate corresponds to a variable vertical blanking region, which is within a range beginning at a minimum vertical blanking region that corresponds to the maximum refresh rate of the display system 130. The I/O engine 125 is coupled to the bus 110 so that the I/O engine 125 communicates with the memory 105, the CPU 115, or other entities that are connected to the bus 110. In the illustrated embodiment, the I/O engine 125 reads information stored on an external storage component 135, which is implemented using a non-transitory computer readable medium such as a compact disk (CD), a digital video disc (DVD), and the like. The I/O engine 125 also writes information to the external storage component 135, such as the results of processing by the CPU 115.

The processing system 100 includes a graphics processing unit (GPU) 140 that renders images for presentation on the display system 130. For example, the GPU 140 renders objects to produce values of pixels that are provided to the display system 130, which uses the pixel values to display an image that represents the rendered objects. The GPU 140 includes one or more processing elements such as an array 142 of compute units that execute instructions concurrently or in parallel. Some embodiments of the GPU 140 are used for general purpose computing. In the illustrated embodiment, the GPU 140 communicates with the memory 105 (and other entities that are connected to the bus 110) over the bus 110. However, some embodiments of the GPU 140 communicate with the memory 105 over a direct connection or via other buses, bridges, switches, routers, and the like. The GPU 140 executes instructions stored in the memory 105 and the GPU 140 stores information in the memory 105 such as the results of the executed instructions. For example, the memory 105 stores a copy 145 of instructions that represent a program code that is to be executed by the GPU 140. The GPU 140 also includes a timing reference 144.

The GPU 140 renders a stream of frames that is provided to the display system 130. Some embodiments of the GPU 140 present frames having a nominal vertical blanking region that corresponds to a nominal frame length rendered by the GPU 140. Some embodiments of the display system 130 include a buffer 150 that stores the frames in the stream received from the GPU 140. The display system 130 also includes a processing element 152 that reads out the pixel values in the frames from the buffer 150 and uses the values to present an image on (or provide an image to) a screen 154. The display system 130 also includes a timing reference 156, which is synchronized to the GPU timing reference 144 during normal operation and used to display copies of captured frames during the PSR mode. For example, the GPU 140 can provide frames at 60 Hz and the display system can read/display the frames on the screen 154 at 60 Hz at times that are synchronized to the GPU 140. Some embodiments of the timing reference 156 are implemented in a timing controller (TCON) chip 157, e.g., as an application-specific integrated circuit (ASIC) or other circuit, which also performs timing and synchronization operations for the display system 130, as discussed herein. The display system 130 also includes a monitor scaler 158 that scales information in the frames received from the GPU 140 to the pixel density of the screen 154. The monitor scaler 158 is optional (as indicated by the dashed line) and is not implemented in some embodiments of the processing system 100.

In some embodiments, each frame in the stream includes information representative of pixels in lines of the frame during a vertical active region of the frame. In addition to the vertical active region, each frame in the stream includes a vertical blanking region and, as discussed herein, the GPU 140 does not transmit active video information during the vertical blanking region of the frame. The GPU 140 provides the frames at a refresh rate that is determined by the timing reference 144.

The display system 130 implements a panel self-refresh (PSR) mode using a captured frame that is stored in the buffer 150. The frame is captured prior to the GPU 140 and the display system 130 entering the PSR mode. During the PSR mode, the GPU 140 interrupts providing frames to the display system 130 and enters a low power state. During the PSR mode, the display system 130 refreshes the screen 154 using the captured frame at periodic intervals determined by the internal timing reference 156 of the display system 130. For example, the processing element 152 reads the captured frame from the buffer 150 at periodic intervals and renders the captured frame to the screen 154 for display by the display system 130. The GPU 140 and the display system 130 exit the PSR mode in response to a screen update or activities such as a user providing input via a touch screen on the display system 130, a keyboard, a mouse, and the like. However, as discussed herein, upon exit from the PSR mode, the GPU timing reference 144 is out of phase with the internal timing reference 156 being used by the display system 130 to refresh the screen.

Some embodiments of the GPU 140 and the display system 130 exchange timing information that is used to re-synchronize timing in the GPU 140 and the display system 130. In some embodiments, the GPU 140 provides the timing information 160 to the display system 130 prior to entering the PSR mode. The timing information 160 indicates a refresh rate that is to be used by the display system 130 when refreshing the screen 154 during the PSR mode. For example, the GPU 140 can determine the refresh rate, which is then used to determine a total duration of a frame presented by the GPU 140 (including a vertical active region and a vertical blanking region) and a duration of the vertical blanking region of the frame presented by the GPU 140. The timing information 160 is provided to the display system 130, which can modify its refresh rate based on the received timing information, e.g., by increasing the duration of the vertical blanking region of the frames retrieved from the remote frame buffer and displayed during the PSR mode. Some embodiments of the timing information 160 indicate a refresh rate that is lower than the maximum refresh rate supported by the display system 130 or a corresponding minimum vertical blanking region supported by the display system 130. In response to the GPU 140 and the display system 130 initiating exit from the PSR mode, the display system 130 refreshes images presented by the display system at a refresh rate that is less than or equal to the maximum refresh rate. In that case, the display system 130 is using a vertical blanking region that is greater than the minimum vertical blanking region. The refresh rate or vertical blanking region signaled by the GPU 140 is not necessarily used by the display system 130 as long as the refresh rate used by the display system 130 is less than the maximum refresh rate and the vertical blanking region is larger than the minimum vertical blanking region.

In some embodiments, the display system 130 provides timing information 165 in response to initiating exit from the PSR mode. The timing information 165 indicates the current scanout line at the display system 130. The current scanout line is the line that is being read or displayed by the display system 130 when the timing information 165 is provided to the GPU 140, e.g., a line in the vertical active region or the vertical blanking region. The GPU 140 determines when to resume transmitting frames to the display system based on the received timing information 165. For example, the GPU 140 uses the value of the current scanout line, the number of lines in the vertical active region, and a line period to determine a subsequent time that corresponds to the end of a vertical blanking region at the display system. In some embodiments, the GPU 140 uses both the refresh rate information (e.g., the timing information 160 provided prior to entering the PSR mode) and the current scanout line (e.g., the timing information 165 provided in response to initiating exit from the PSR mode) to schedule the subsequent time to resume transmitting frames to the display system 130.

Figure 2:
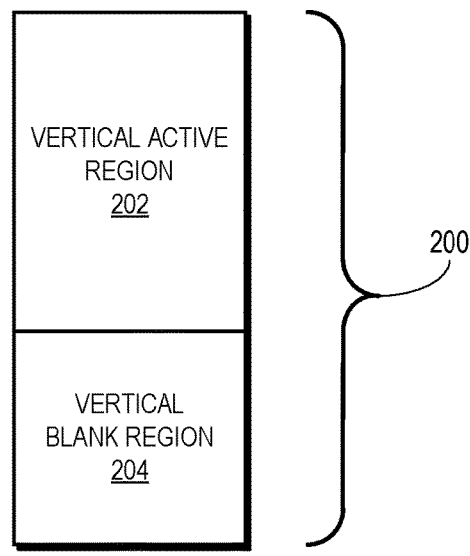
FIG. 2 is a block diagram of a frame according to some embodiments.

FIG. 2 is a block diagram of a frame 200 according to some embodiments. The frame 200 is partitioned into a vertical active region 202 and a vertical blanking region 204. In the illustrated embodiment, the frame 200 is used to depict images in a horizontally scanned landscape mode display. However, in other embodiments, the techniques disclosed herein are applicable to displays that scan lines in other orientations. Some embodiments of the vertical active region 202 are used to convey information representative of pixels in the frame from a processing unit such as the GPU 140 shown in FIG. 1 to a display system such as the display system 130 shown in FIG. 1. The processing unit does not transmit active video information during the vertical blanking region 204 of the frame 200, although metadata such as that are used to define pixel formats can be transmitted during the vertical blanking region 204. A high definition frame can represent an image using a vertical active region 202 that includes 1080 active lines that include values of the pixels and a vertical blanking region 204 that includes 45 blanking lines.

Figure 3:
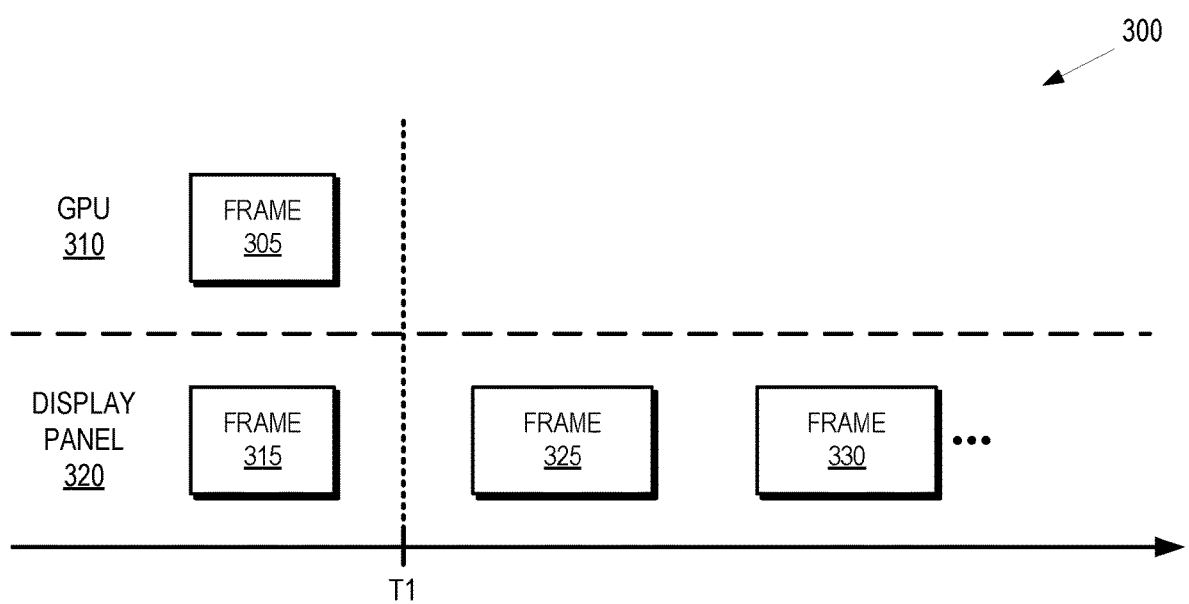
FIG. 3 is a block diagram illustrating a temporal sequence of frames prior to and during a PSR mode according to some embodiments.

FIG. 3 is a block diagram illustrating a temporal sequence 300 of frames prior to and during a PSR mode according to some embodiments. The temporal sequence 300 includes a frame 305 rendered by and transmitted from a GPU 310, which is implemented using some embodiments of the GPU 140 shown in FIG. 1. The temporal sequence 300 also includes a frame 315 that is captured from a stream of frames generated by the GPU 310 and stored in a buffer of a display system 320, which is implemented using some embodiments of the display system 130 shown in FIG. 1. In some cases, the frame 315 and the frame 305 represent the same image. Prior to entering the PSR mode, the GPU 310 is rendering and providing frames at a nominal frame rate and the display system 320 is presenting or displaying the frames at the nominal frame rate.

The GPU 310 and the display system 320 enter the PSR mode at the time T1. The GPU 310 interrupts provision of the stream of frames to the display system 320 in response to entering the PSR mode. Interrupting provision of the stream of frames is also referred to as "interrupting the stream" or "stopping the stream," or using other equivalent formulations. Some embodiments of the GPU 310 enter a low-power mode to conserve power while in the PSR mode. Since the GPU 310 is no longer transmitting or providing frames to the display system 320, the display system 320 refreshes an image display to a screen using the frame 315 stored in the buffer to produce the frame 325, 330. As discussed herein, some embodiments of the display system 320 modify a refresh rate used to display the buffered frame 315 while in the PSR mode. The modification to the refresh rate is determined based on timing information received from the GPU 310 prior to entering the PSR mode at the time T1. In some embodiments, the timing information includes information indicating a duration of a vertical active region and a duration of a vertical blanking region in the frame presented by the GPU 310. The refresh rate used by the display system 320 produces a frame length equal to twice the total duration of the frame minus the duration of the vertical blanking region. Thus, the duration of the frame 325, 330 is longer than the duration of the frame 305, 315 to increase the refresh rate that is used by the display system 320 while in the PSR mode.

Figure 4:
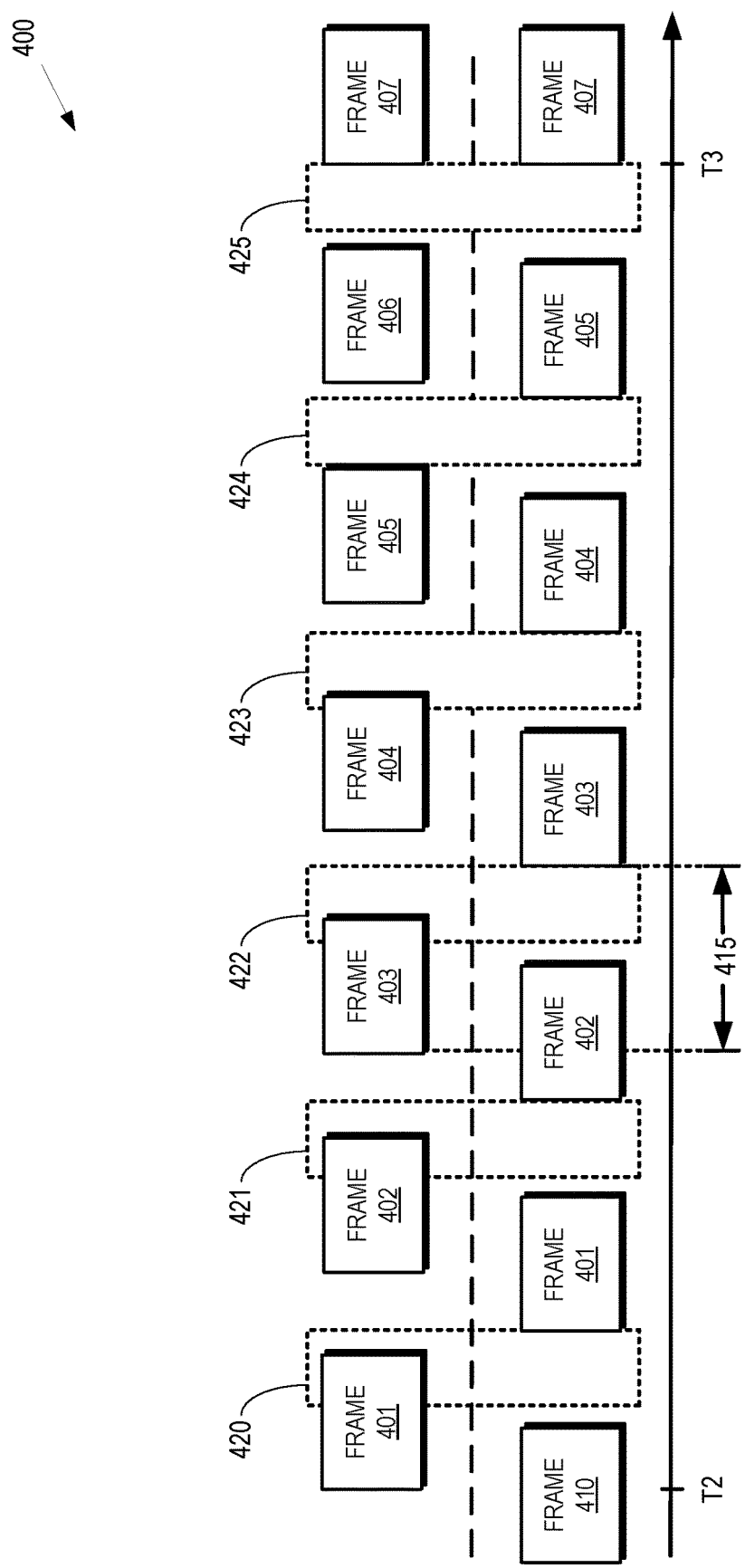
FIG. 4 is a block diagram illustrating a temporal sequence of frames during conventional resynchronization process that is performed in response to exiting a PSR mode.

FIG. 4 is a block diagram illustrating a temporal sequence 400 of frames during conventional resynchronization process that is performed in response to exiting a PSR mode. The temporal sequence 400 occurs following the temporal sequence 300 shown in FIG. 3. An upper series of frames 401, 402, 403, 404, 405, 406, 407 represents frames 401-407 that are rendered by a processing unit such as the GPU 140 shown in FIG. 1 and provided to a display system such as the display system 130 shown in FIG. 1. The lower series of frames 401-405, 407, and 410 represent the frames 401-405, 407, and 410, that are presented on a corresponding screen by a display system such as the display system 130 shown in FIG. 1. In some embodiments, the frame 410 is presented based on the captured and buffered frame 315 shown in FIG. 3. For example, the frame 410 represent some embodiments of the frames 325, 330 shown in FIG. 3. The display system presents the same frame 410 until the display system and the GPU exit the PSR mode at the time T2.

In response to exiting the PSR mode at the time T2, the display system begins displaying the frames 401-405, 407 that are provided by the GPU. However, the timing references implemented in the display system and the GPU are not initially synchronized upon exit from the PSR mode. Consequently, there is a latency between rendering of the frames 401-405 at the GPU and presentation of the frames 401-405 by the display system. For example, the frame 403 is displayed after a latency 415 between the time the frame 403 is provided by the GPU and the time the frame 403 is presented by the display system.

The frames 401-405, 407, 410 that are presented by the display system are separated by vertical blanking resynchronization regions 420, 421, 422, 423, 424, 425, which are collectively referred to herein as "the vertical blanking resynchronization regions 420-425." Resynchronization between the timing references of the GPU and the display system is permissible once the beginning of the frame being transmitted by the GPU is within a corresponding one of the vertical blanking resynchronization region 420-425 that directly precedes the frame being displayed by the display unit. For example, the timing references cannot be resynchronized at the frame 401 because the frame 401 begins subsequent to a vertical blanking resynchronization region (not shown) that directly precedes the frame 410. For another example, the timing references can be resynchronized at the frame 407 because the beginning of the frame 407 is within the corresponding vertical blanking resynchronization region 425 that directly precedes the frame 407. The term "beginning of a frame being within a vertical blanking resynchronization region" is equivalent to "the beginning of a frame overlapping with a vertical blanking resynchronization region" and "the beginning of a frame being concurrent with a vertical blanking resynchronization region," as well as other similar formulations.

As noted above, the timing references of the GPU and the display system are out of phase at the frame 401 because the relative timing at the GPU and the display system changes during the PSR mode. In the absence of an explicit resynchronization signal that is transmitted from the display system to the GPU in response to exiting the PSR mode, the GPU and the display system are re-synchronized by progressively aligning GPU frames 401-407 with the vertical blanking resynchronization regions 420-425 at the display system by refreshing the display system at a rate that is slightly lower than the refresh rate used by the GPU, e.g., the display system uses a refresh rate of 48 Hz and the GPU uses a refresh rate of 60 Hz. Smaller differences between the display system refresh rate and the GPU refresh rate increase the maximum number of frames required for resynchronization and larger differences decrease the maximum number of frames required for resynchronization.

The difference in the refresh rates progressively decreases a separation between a GPU frame 401-407 and the corresponding vertical blanking resynchronization region 420-425. For example, the temporal distance between the frame 402 and the corresponding vertical blanking resynchronization region 420 is larger than the temporal distance between the frame 405 and the corresponding vertical blanking resynchronization region 423. Eventually, the beginning of one of the frames 401-407 is within or overlaps with a corresponding vertical blanking resynchronization region 420-425. For example, the beginning of the frame 407 overlaps with the vertical blanking resynchronization region 425. Once the beginning of one of the frames 401-407 is within a corresponding vertical blanking resynchronization region 420-425, resynchronization is performed between the GPU and the display system. In the illustrated embodiment, resynchronization occurs at the time T3 and subsequent to the time T3 the display system displays the frame 407 (and subsequent frames) in synchronization with the GPU.

Resynchronization includes resynchronization of timing references at the GPU and the display system such as the timing references 144, 146 shown in FIG. 1. This approach to alignment typically takes several frames 401-407 and therefore introduces latency that undesirably affects the user experience in latency sensitive applications.

Figure 5:
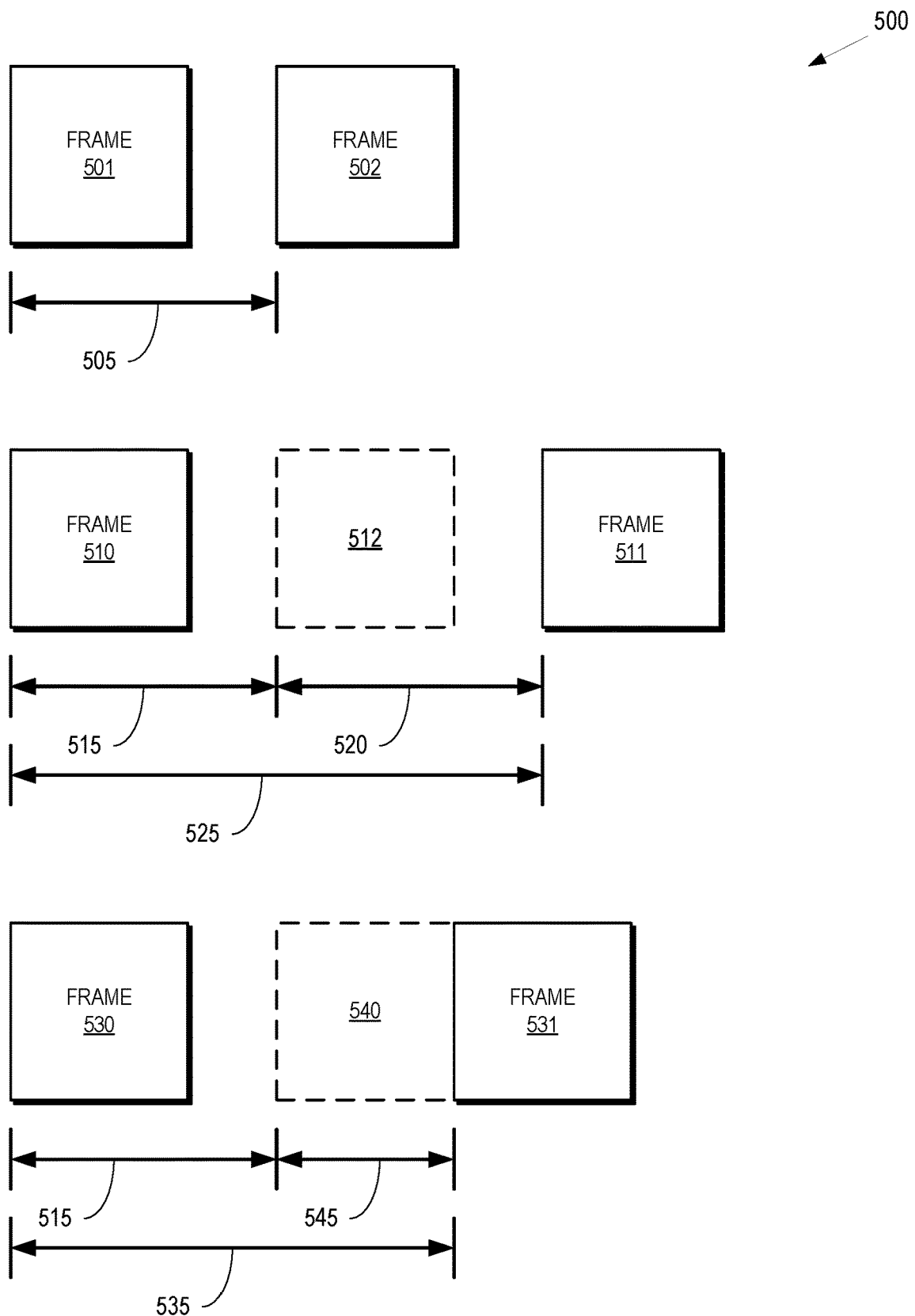
FIG. 5 is a block diagram of a set of frames that are displayed at different refresh rates according to some embodiments.

FIG. 5 is a block diagram of a set 500 of frames that are displayed at different refresh rates according to some embodiments. The frames in the set 500 are displayed by some embodiments of the display system 130 shown in FIG. 1 on a corresponding screen while the display system is in the PSR mode. The frames 501, 502 are presented for display based on a captured/buffered frame that was previously received from a GPU prior to entering the PSR mode. The display system presents the frames 501, 502 at a first refresh rate that corresponds to a first frame length 505, which includes a vertical active region and a vertical blanking region. As discussed above with regard to FIG. 4, the first frame length 505 is slightly longer, and the corresponding first refresh rate slightly shorter, than the nominal frame length of frames that are rendered by the GPU. Thus, resynchronization of the display system to the corresponding processing unit requires several cycles to complete.

The frames 510, 511 are displayed by the display system on a corresponding screen at a second refresh rate that is lower than the refresh rate used by the GPU. In some embodiments, the display system refresh rate is equal to a value equal to one-half of a nominal refresh rate used by the GPU. As illustrated in FIG. 5, prior to entering the PSR mode the GPU renders frames at a nominal frame rate indicated by the frame lengths 515, 520. However, in the PSR mode, the display system presents the same frame (represented by the frames 510, 511) with a second frame length 525. The second frame length 525 of the frame 510 presented by the display system, e.g., using a captured/buffered frame received from the GPU, is therefore equal to the sum of the frame lengths 515, 520. The dashed box 512 represents a frame that the display system would repeat if the display system continued presenting frames at the nominal refresh rate when in PSR mode. Decreasing the refresh rate at the display system to correspond to the second frame length 525 increases the time interval available for resynchronization of the GPU and the display system, which greatly reduces the resynchronization latency.

The frames 530, 531 are presented by the display system on a corresponding screen at a third refresh rate that corresponds to a third frame length 535 that is equal to the second frame length 525 minus a duration of a vertical blanking region of a frame 540 presented by the GPU. Thus, a vertical blanking region between the frames 530, 531 corresponds to a frame length equal to twice the nominal frame length 515 minus a duration of the nominal vertical blanking region. Thus, the third frame length 535 is equal to the sum of the frame lengths 515, 520 minus the duration of the vertical blanking region of the frame 540. Equivalently, the third frame length 535 is equal to the frame length 515 plus a duration 545 of the vertical active region of the frame 540. Refreshing the screen at the display system at the third refresh rate corresponding to the third frame length 535 ensures that the resynchronization is completed, at the latest, by the second frame transmitted by the GPU. Thus, a maximum resynchronization interval (i.e., the maximum amount of time required to perform the resynchronization in response to exiting a PSR mode) is less than one frame period at the maximum refresh rate.

Figure 6:
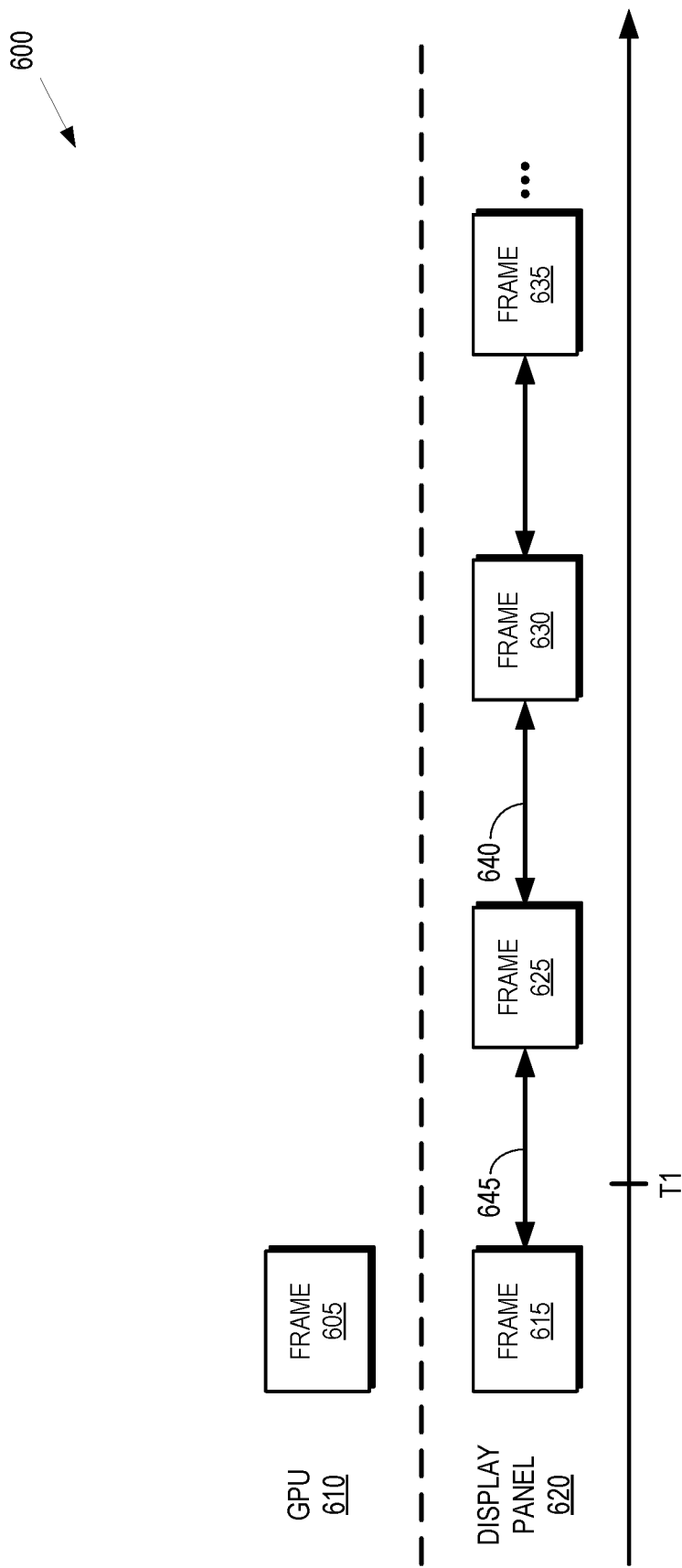
FIG. 6 is a block diagram illustrating a temporal sequence of frames prior to and during a PSR mode according to some embodiments.

FIG. 6 is a block diagram illustrating a temporal sequence 600 of frames prior to and during a PSR mode according to some embodiments. The temporal sequence 600 includes a frame 605 rendered by and transmitted from a GPU 610, which is implemented using some embodiments of the GPU 140 shown in FIG. 1. The temporal sequence 600 also includes a frame 615 that is captured from a string of frames rendered by the GPU 610 and stored in a buffer of a display system 620, which is implemented using some embodiments of the display system 130 shown in FIG. 1. In some cases, the frame 615 and the frame 605 represent the same image.

The GPU 610 and the display system 620 enter the PSR mode at the time T1. Prior to entering the PSR mode, the GPU 610 provides timing information that indicates a refresh rate to be used by the display system 620 while in the PSR mode. As discussed herein with regard to FIG. 5, the refresh rate is determined based on the nominal frame length of frames presented by the GPU 610 and a length of a vertical blanking region. Subsequent to entering the PSR mode at the time T1, the display system 620 displays frames 625, 630, 635 on a screen based on a captured/buffered frame such as the frame 615 that was received from the GPU 610 prior to the time T1. The frame length used by the display system 620 in the PSR mode is longer than the nominal frame length used by the display system 620 prior to entering the PSR mode, as indicated by the relative lengths of the arrows 640, 645. In some embodiments, durations of vertical blanking regions are indicated by the arrow 640, 645 and the frame length used by the display system 620 in the PSR mode is increased by increasing the duration of the vertical blanking regions during the PSR mode.

Figure 7:
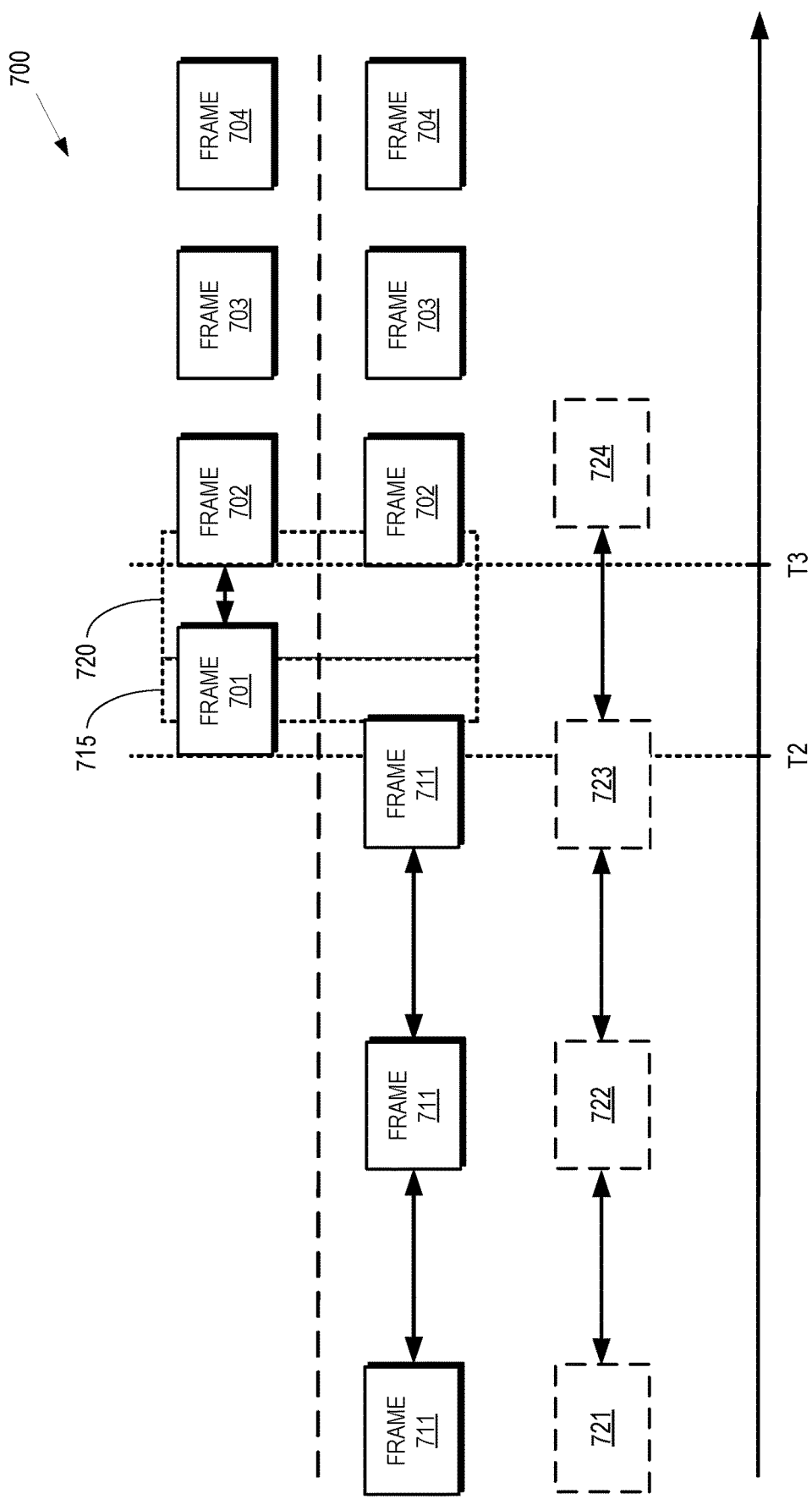
FIG. 7 is a block diagram illustrating a temporal sequence of frames during a resynchronization process that is performed based on a modified refresh rate according to some embodiments.

FIG. 7 is a block diagram illustrating a temporal sequence 700 of frames during a resynchronization process that is performed based on a modified refresh rate according to some embodiments. The temporal sequence 700 occurs following the temporal sequence 600 shown in FIG. 6. An upper series of frames 701, 702, 703, 704 represents frames 701-704 that are rendered by a processing unit such as the GPU 140 shown in FIG. 1 and provided to a display system such as the display system 130 shown in FIG. 1. The lower series of frames 702-704, 711 represent the frames 702-704, 711 that are presented on a corresponding screen by a display system such as the display system 130 shown in FIG. 1. In some embodiments, the frame 711 is displayed based on the captured and buffered frame 615 shown in FIG. 6. For example, the frame 711 can represent the frames 625, 630, 635 shown in FIG. 6.

The display system initiates exit from the PSR mode at the time T2. In the illustrated embodiment, the refresh rate used by the display system is decreased in the PSR mode by using refresh rates that are lower than the maximum refresh rates supported by the display system and vertical blanking regions that are longer than the minimum vertical blanking region supported by the display system. For example, a nominal vertical blanking region 715 for the frame 711 is extended using an additional vertical blanking region 720 so that the total vertical blanking region is longer than a minimum vertical blanking region. The sum of the vertical blanking regions 715, 720 provides an additional time interval to re-synchronize the GPU and the display system. In the illustrated embodiment, the dashed boxes 721, 722, 723, 724 represent the timing of the corresponding frames 711 prior to resynchronization. The GPU renders and transmits the frames 701-704 at its nominal frame rate based on its internal timing reference. The beginning of the first frame 701 does not overlap with the extended vertical blanking region directly preceding the frame 711. However, the beginning of the second frame 702 is within the additional vertical blanking region 720. Thus, the GPU and the display system resynchronize concurrently with the additional vertical blanking region 720 and complete resynchronization at the second frame 702 so that the display panel provides the frame 702 using the timing reference that is synchronized to the GPU timing reference. Due to the vertical blanking regions 715, 720 being longer than a minimum vertical blanking region, resynchronization is performed within two frames at the nominal refresh rate of the GPU.

Figure 8:
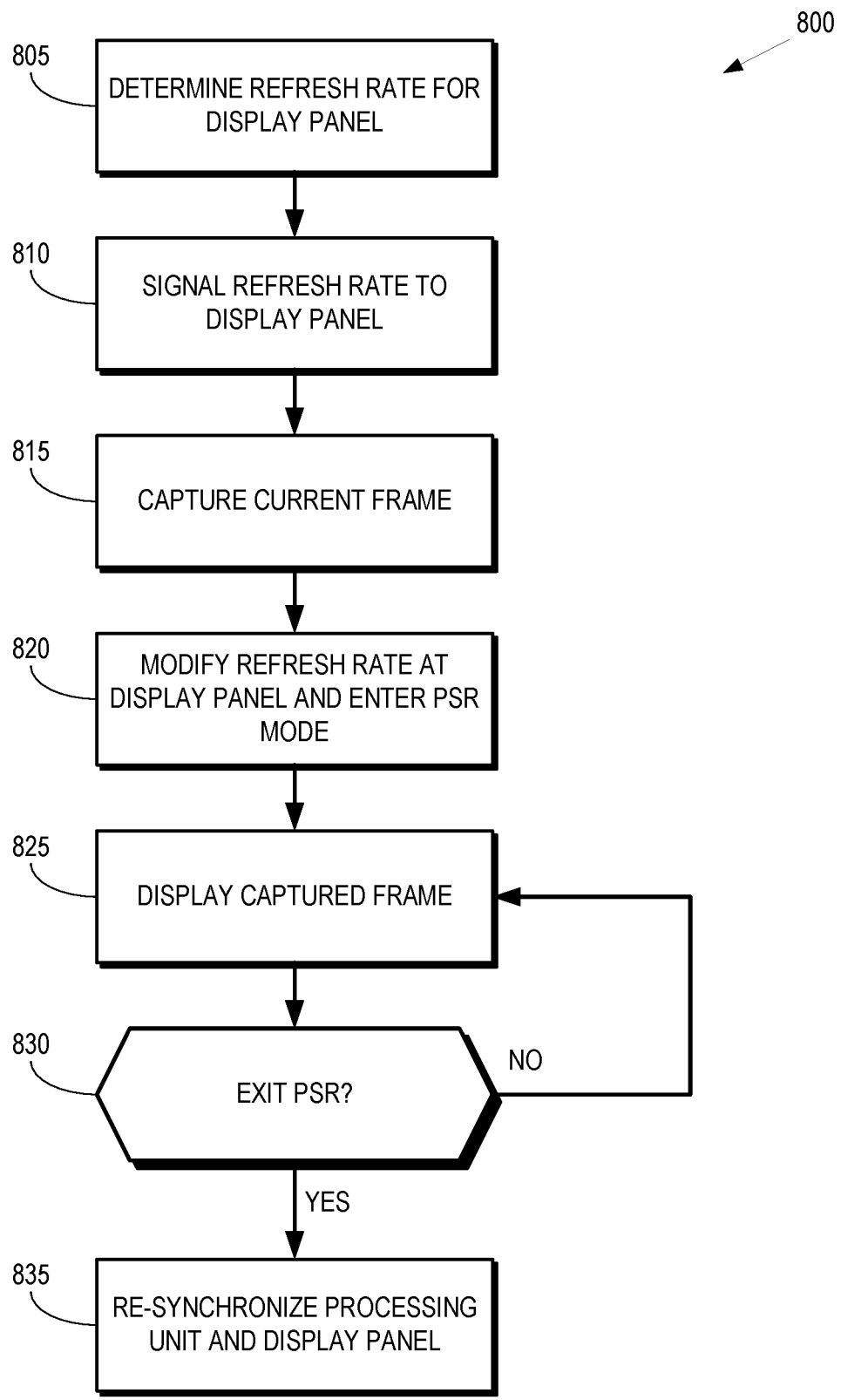
FIG. 8 is a flow diagram of a method of dynamically modifying a display system refresh rate in a PSR mode according to some embodiments.

FIG. 8 is a flow diagram of a method 800 of dynamically modifying a display system refresh rate in a PSR mode according to some embodiments. The method 800 is implemented in a processing unit and a display system such as some embodiments of the GPU 140 and the display system 130 shown in FIG. 1. As discussed herein, modifying the refresh rate is equivalent to modifying a corresponding vertical blanking region.

At block 805, the processing unit determines a refresh rate for the display system to use while in the PSR mode. In some embodiments, the display system uses a refresh rate that is less than half the maximum refresh rate supported by the display system. Equivalently, the display system uses a frame period that is at least twice the minimum frame period supported by the display system.

At block 810, the processing unit signals the refresh rate to the display system. In some embodiments, the processing unit sends a message indicating a duration of a vertical active region of the frame presented by the processing unit and a duration of a vertical blanking region of the frame presented by the processing unit. For example, the message can indicate that the display system is to use a refresh rate that is less than or equal to one half of the maximum refresh rate.

At block 815, the display system captures a current frame received from the processing unit. Information representing the captured frame is stored in the buffer at the display system.

At block 820, the display system modifies the refresh rate based on the information received from the processing unit. The display system and the processing unit enter the PSR mode.

At block 825, the display system begins refreshing an image presented on a corresponding screen at (or below) the refresh rate signaled by the GPU. In the illustrated embodiment, the display system displays the captured frame at (or below) the refresh rate signaled by the GPU.

At block 830, the display system determines whether to exit the PSR mode, e.g., in response to user input. If the display system decides not to exit the PSR mode, the method 800 returns to block 825 and the display system continues to display the captured frame at (or below) the refresh rate signaled by the GPU. If the display system decides to exit the PSR mode, the method 800 flows to block 835.

At block 835, the processing unit and the display system are re-synchronized, e.g., using the technique disclosed herein with regard to FIG. 7. In some embodiments, using a refresh rate that is less than half the maximum refresh rate supported by the display system during the PSR mode, or, equivalently, using a frame period that is at least twice the minimum frame period supported by the display system results in a maximum resynchronization interval (i.e., the maximum amount of time required to perform the resynchronization in response to exiting the PSR mode) that is less than one frame period at the maximum refresh rate.

Figure 9:
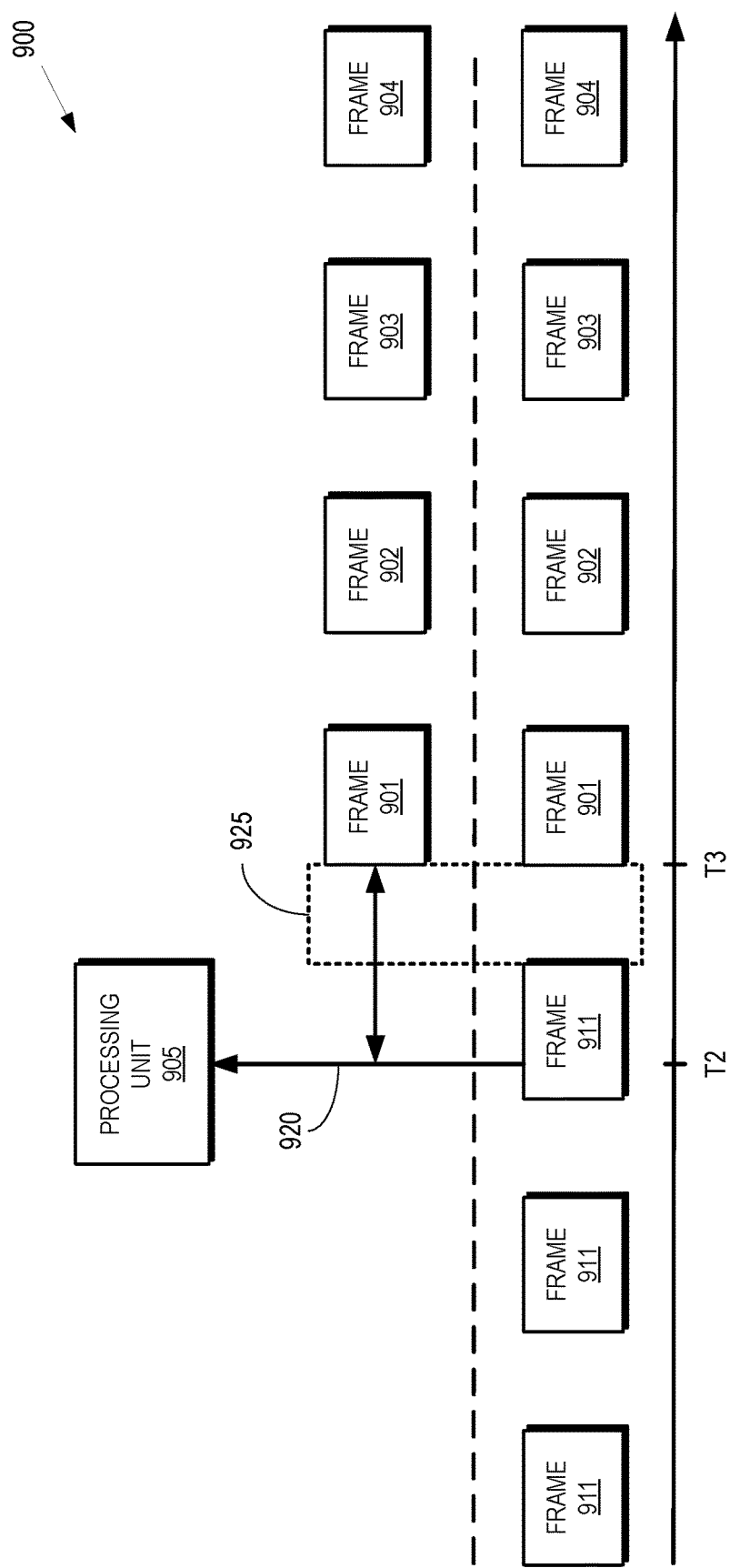
FIG. 9 is a block diagram illustrating a temporal sequence of frames during a resynchronization process that is performed based on a current scanout line according to some embodiments.

FIG. 9 is a block diagram illustrating a temporal sequence 900 of frames during a resynchronization process that is performed based on a current scanout line according to some embodiments. The temporal sequence 900 occurs following the temporal sequence 600 shown in FIG. 6. An upper series of frames 901, 902, 903, 904 represents frames 901-904 that are rendered by a processing unit 905 such as the GPU 140 shown in FIG. 1 and provided to a display system such as the display system 130 shown in FIG. 1. The lower series of frames 901-904, 911 represent the frames 901-904, 911 that are presented on a corresponding screen by a display system such as the display system 130 shown in FIG. 1. In some embodiments, the frame 911 is displayed based on the captured and buffered frame 615 shown in FIG. 6. For example, the frame 911 can represent the frames 625, 630, 635 shown in FIG. 6. The display system presents the same frame 911 until timing of the display system is re-synchronized with timing of the processing unit 905.

At the time T2, the display system initiates an exit from the PSR mode. The display system transmits information indicating a current scanout line for the frame 911 to the processing unit 905, as indicated by the arrow 920. The current scanout line is the line in the vertical active region of the frame 911 that is being read by the display system for presentation on the screen when the display system initiates the exit from the PSR mode, e.g., at the time T2 in FIG. 9. In some embodiments, the information indicating the current scanout line is transmitted via a side channel such as an AUX channel between the display system and the processing unit 905. The display system continues to read out additional lines for presentation on the screen after transmitting the information indicating the current scanout line.

The processing unit 905 uses the information indicating the current scanout line to schedule transmission of the frame 901 so that the beginning of the frame 901 is within the vertical blanking region 925. The processing unit 905 determines the time T3 for transmitting the frame 901 based on the information indicating the current scanout line and the value of the duration of the vertical active region 925. The duration of the vertical active region 925 is determined by the number of lines in the vertical active region 925 and the line period that represents the time that elapses between each line. The processing unit 905 also compensates for the advancement of the scanout line during the time required to read back information from the display system. In some embodiments, the time required to read back information is pre-tuned by hard coding a value for the required time at the processing unit 905 or using a value that is provided by the display system. Alternatively, runtime calibration of the delay is performed using signals exchanged by the processing unit 905 and the display system. Scheduling transmission of the frame 901 at the time T3 ensures that resynchronization between the processing unit 905 and the display system is performed within a single frame because the beginning of the frame 901 is within the vertical blanking region 925 that directly precedes the frame 901. Thus, the display system presents the frame 901 in synchronization with the GPU providing the frame 901.

Some embodiments of the display system switch to a lower refresh rate (e.g., a longer vertical blanking region) in response to transmitting the information indicating the scanout line at the arrow 920. This provides the processing unit 905 with additional timing margin for beginning transmission of the frame 900 and one. For example, if the processing unit 905 transmits the frame 901 late by a time corresponding to, e.g., 10% of a frame, and the display system has started refreshing with 911 again by that time, then longer re-sync time is required.

Figure 10:
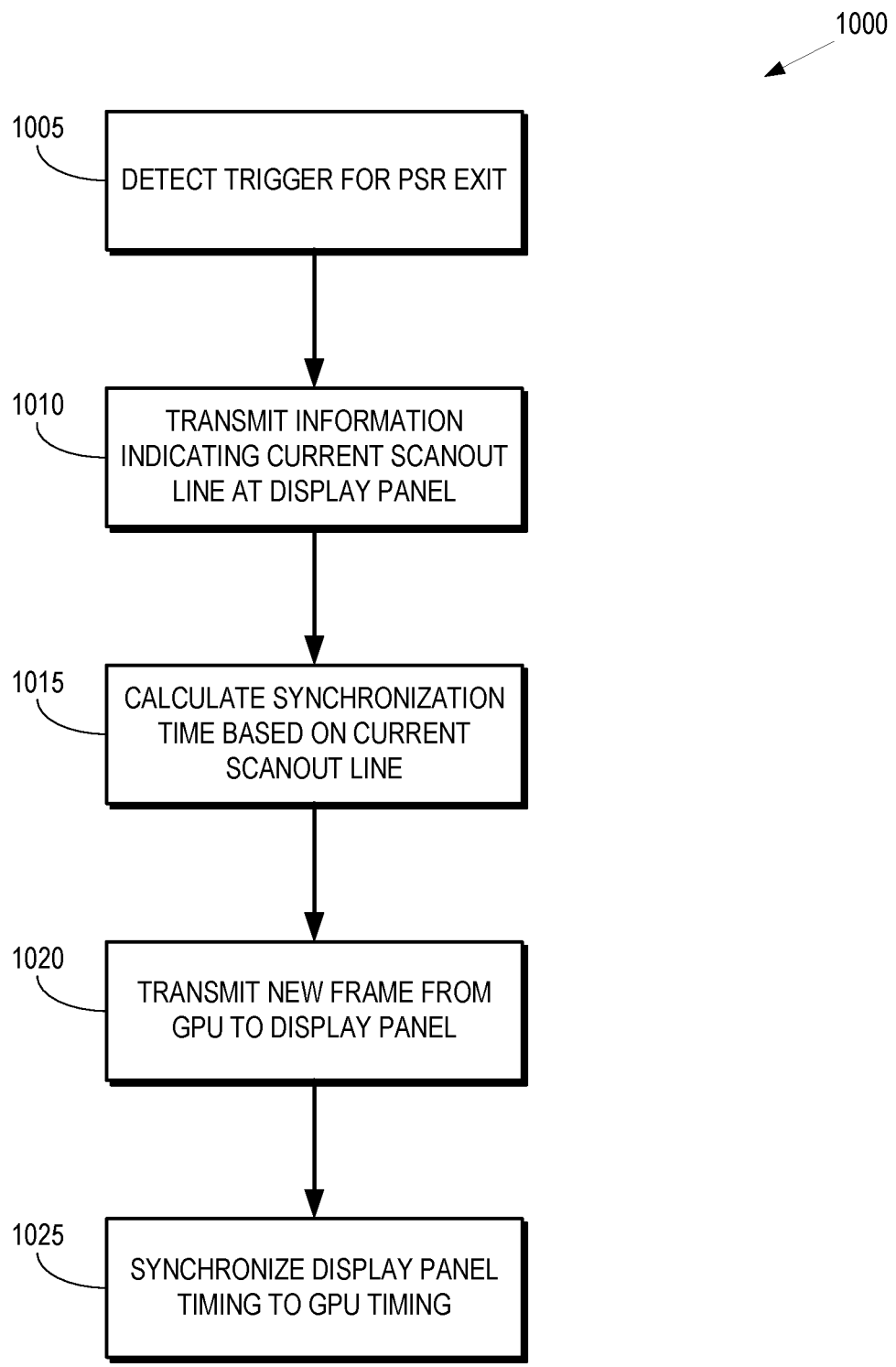
FIG. 10 is a flow diagram of a method of scheduling transmission of a frame from a processing unit to a display mode in response to exiting a PSR mode according to some embodiments.

FIG. 10 is a flow diagram of a method 1000 of scheduling transmission of a frame from a processing unit to a display mode in response to exiting a PSR mode according to some embodiments. The method 1000 is implemented in a processing unit and a display system such as some embodiments of the GPU 140 and the display system 130 shown in FIG. 1. Initially, the processing unit and the display system are in the PSR mode.

At block 1005, an event triggers an exit from the PSR mode. Some embodiments of the GPU detect the triggering event, which are any events that result in a required screen update. Examples of events that trigger the exit include input from a user such as typing on a keyboard, a mouse click or motion, touching a touchscreen, and the like. In response to detecting a triggering event, the GPU initiates the exit from PSR by signaling the display system. The display system transition starts in response to the GPU signal.

At block 1010, the display system transmits information indicating the current scanout line to a processing unit. The processing unit receives the information transmitted from the display system.

At block 1015, the processing unit calculates a synchronization time based on the current scanout line. As discussed herein, calculating the synchronization time includes accounting for transmission time delays or processing latency between the time the current scanout line information is transmitted and the time the processing unit finishes the scheduling process.

At block 1020, the processing unit transmits the new frame to the display system at the scheduled time. Since the scheduled time is chosen to ensure that the beginning of the new frame is within the vertical blanking region that directly precedes the next frame that is to be displayed by the display system, the processing unit and the display system synchronize their respective timing references at block 1025. The display system is therefore able to display the new frame provided by the processing unit (and subsequent frames provided by the processing unit) based on the timing reference in the processing unit.

Figure 11:
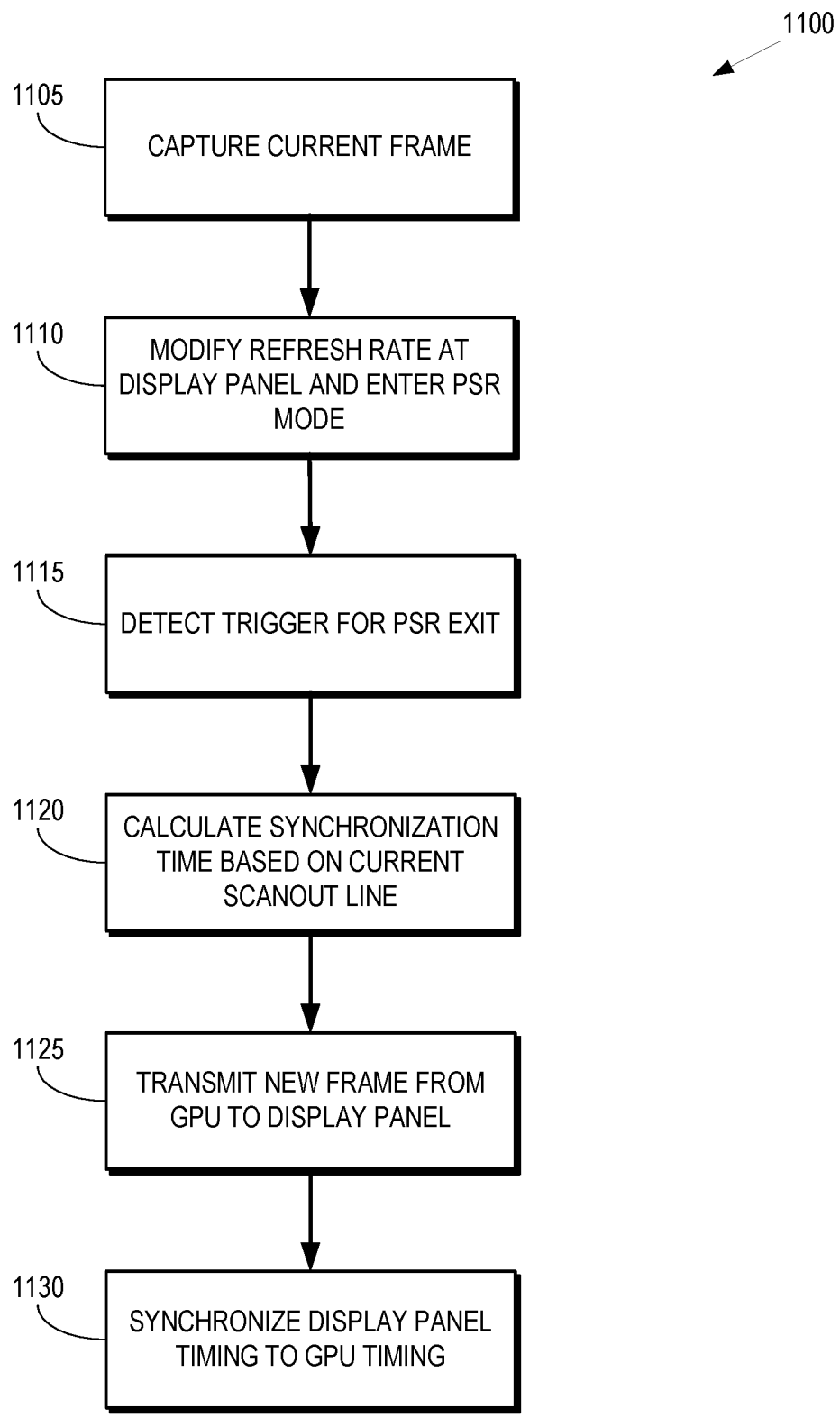
FIG. 11 is a flow diagram of a method of synchronizing display system timing with GPU timing in response to exiting a PSR mode according to some embodiments.

FIG. 11 is a flow diagram of a method 1100 of synchronizing display system timing with GPU timing in response to exiting a PSR mode according to some embodiments. The method 1100 is implemented in a processing unit and a display system such as some embodiments of the GPU 140 and the display system 130 shown in FIG. 1.

At block 1105, the display system captures a current frame received from the processing unit. Information representing the captured frame is stored in the buffer at the display system.

At block 1110, the display system chooses or modifies the refresh rate based on the information received from the processing unit. In some embodiments, the processing unit sends a message indicating a duration of a vertical active region of the frame rendered by the processing unit and a duration of a vertical blanking region of the frame rendered by the processing unit. The display system calculates the refresh rate and its corresponding vertical blanking region based on the provided information. As discussed herein, the refresh rate used by the display system is less than a maximum refresh rate and the vertical blanking region use by the display system is larger than a minimum vertical blanking region. In some embodiments, the refresh rate is less than half the maximum refresh rate supported by the display system. Equivalently, the display system uses a frame period that is at least twice the minimum frame period supported by the display system. The display system and the processing unit enter the PSR mode.

At block 1115, an event is detected that triggers an exit from the PSR mode. The event that triggers the exit includes input from a user such as typing on a keyboard, a mouse click or motion, touching a touchscreen, and the like. As discussed herein, some embodiments of the GPU detect the triggering event and signal the display system to exit the PSR mode.

At block 1120, the processing unit calculates a synchronization time based on the current scanout line and the modified refresh rate. In some embodiments, the display system implements the modified refresh rate by extending a vertical blanking region and so the synchronization time is calculated to fall within the extended vertical blanking region. As discussed herein, calculating the synchronization time includes accounting for transmission time delays or processing latency between the time the current scanout line information is transmitted and the time the processing unit finishes the scheduling process.

At block 1125, the processing unit transmits the new frame to the display system at the scheduled time. Since the scheduled time is chosen to ensure that the beginning of the new frame is within the extended vertical blanking region that directly precedes the next frame that is to be displayed by the display system, the processing unit and the display system synchronize their respective timing references at block 1130. The display system is therefore able to display the new frame provided by the processing unit (and subsequent frames provided by the processing unit) based on the timing reference in the processing unit.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
  receiving, at a display system that supports a range of refresh rates and prior to the display system entering a panel self-refresh (PSR) mode, first timing information indicating a first refresh rate that is lower than a maximum refresh rate supported by the display system; and
  refreshing images presented by the display system, during the PSR mode, at a second refresh rate that is in the range of refresh rates up to the first refresh rate using a frame stored in a buffer prior to entering the PSR mode.

2. The method of claim 1, wherein receiving the first timing information comprises receiving information indicating a first vertical blanking region that is longer than a minimum vertical blanking region that corresponds to the maximum refresh rate.

3. The method of claim 2, wherein a processing unit provides frames having a nominal vertical blanking region that corresponds to a nominal frame length presented by the processing unit, and wherein the first vertical blanking region corresponds to a frame length of at least twice the nominal frame length minus a duration of the nominal vertical blanking region.

4. The method of claim 2, further comprising:
  initiating exit from the PSR mode; and
  performing, in response to the exit from the PSR mode, resynchronization of the display system with a processing unit concurrently with the first vertical blanking region that is longer than the minimum vertical blanking region.

5. The method of claim 4, wherein a maximum resynchronization interval is less than one frame period at the maximum refresh rate.

6. The method of claim 1, further comprising:
  transmitting, from the display system, second timing information indicating a current scanout line of the display system to a processing unit via a side channel.

7. The method of claim 6, wherein performing resynchronization of the display system comprises receiving, in response to initiating exit from the PSR mode, a subsequent frame from the processing unit at a subsequent time indicated by the current scanout line.

8. A method comprising:
  receiving, at a processing unit from a display system, first timing information indicating a current scanout line of the display system in response to initiating an exit from a panel self-refresh (PSR) mode;
  scheduling transmission of a subsequent frame from the processing unit to the display system at a subsequent time, during the PSR mode, indicated by the current scanout line; and
  transmitting the subsequent frame to the display system at the subsequent time.

9. The method of claim 8, wherein receiving the first timing information indicating the current scanout line comprises receiving the first timing information via a side channel between the processing unit and the display system.

10. The method of claim 8, wherein scheduling transmission of the subsequent frame comprises scheduling transmission of the subsequent frame so that a beginning of the subsequent frame is within a vertical blanking region of the display system.

11. The method of claim 10, further comprising:
  determining the subsequent time based on the first timing information indicating the current scanout line, a line period, and a number of lines in a vertical active region.

12. The method of claim 11, wherein determining the subsequent time comprises compensating for advancement of the current scanout line during a time required to read back information from the display system.

13. The method of claim 12, further comprising at least one of:
  hard coding a value for the time required to read back the information;
  using a value of the time required to read back the information that is provided by the display system; and
  performing runtime calibration of the time required to read back the information using signals exchanged by the processing unit and the display system.

14. The method of claim 8, wherein the display system supports a range of refresh rates, the method further comprising:
  receiving, at the display system prior to the display system entering the PSR mode, second timing information indicating a first refresh rate that is lower than a maximum refresh rate supported by the display system; and
  refreshing images presented by the display system at a second refresh rate that is less than or equal to the first refresh rate using a frame stored in a buffer prior to entering the PSR mode.

15. An apparatus, comprising:
  a screen to display images within a range of refresh rates;
  a buffer to store frames received from a processing unit; and
  a processing element configured to provide images to the screen based on the frames stored in the buffer, wherein the processing element is configured to receive, prior to entering a panel self-refresh (PSR) mode, first timing information indicating a first refresh rate that is lower than a maximum refresh rate and to refresh images, during the PSR mode, at a second refresh rate that is in the range of refresh rates up to the first refresh rate using a frame stored in a buffer prior to entering the PSR mode.

16. The apparatus of claim 15, wherein the first timing information indicates a first vertical blanking region that is longer than or equal to a minimum vertical blanking region that corresponds to the maximum refresh rate.

17. The apparatus of claim 16, wherein the processing element provides frames having a nominal vertical blanking region that corresponds to a nominal frame length presented by the processing unit, and wherein the first vertical blanking region corresponds to a first frame length equal to twice the nominal frame length minus a duration of the nominal vertical blanking region.

18. The apparatus of claim 15, wherein the processing element is configured to receive frames from the processing unit at a nominal refresh rate and display the received frames at the second refresh rate until completion of resynchronization in response to exit from the PSR mode.

19. The apparatus of claim 18, wherein a maximum resynchronization interval is less than one frame period at the maximum refresh rate.

20. The apparatus of claim 15, wherein the processing element is configured to provide second timing information indicating a current scanout line to the processing unit via a side channel in response to initiating exit from the PSR mode.

21. The apparatus of claim 20, wherein the processing element is configured to receive a subsequent frame from the processing unit at a subsequent time indicated by the current scanout line.

22. An apparatus, comprising:
a timing reference; and
at least one processing element configured to receive, from a display system, first timing information indicating a current scanout line of the display system in response to initiating an exit from a panel self-refresh (PSR) mode, schedule transmission of a subsequent frame to the display system at a subsequent time, during the PSR mode, indicated by the current scanout line, and to transmit the subsequent frame to the display system at the subsequent time.

23. The apparatus of claim 22, wherein the at least one processing element is configured to receive the first timing information via a side channel to the display system.

24. The apparatus of claim 22, wherein the at least one processing element is configured to schedule the subsequent frame so that a beginning of the subsequent frame is within a vertical blanking region that precedes the subsequent frame.

25. The apparatus of claim 24, wherein the at least one processing element is configured to determine the subsequent time based on the first timing information indicating the current scanout line, line period, and a number of lines in the vertical blanking region.

26. The apparatus of claim 25, wherein the at least one processing element is configured to compensate for advancement of the current scanout line during a time required to read back information from the display system.

27. The apparatus of claim 26, wherein the processing element is configured to compensate for the advancement of the current scanout line by performing at least one of:
hard coding a value for the time required to read back the information;
using a value of the time required to read back the information that is provided by the display system; and
performing runtime calibration of the time required to read back the information using signals exchanged by the processing element and the display system.

28. The apparatus of claim 22, wherein the apparatus supports a range of refresh rates, and wherein the processing element is configured to:
receive, prior to the display system entering the PSR mode, second timing information indicating a first refresh rate that is lower than a maximum refresh rate supported by the display system; and
refresh images at a second refresh rate that is less than or equal to the first refresh rate using a frame stored in a buffer prior to entering the PSR mode.

* * * * *